(12) United States Patent
Dingli et al.

(10) Patent No.: US 11,148,673 B2
(45) Date of Patent: Oct. 19, 2021

(54) VEHICLE OPERATOR AWARENESS DETECTION

(71) Applicant: Pony Al Inc., Grand Cayman (KY)

(72) Inventors: Robert Dingli, Cupertino, CA (US); Peter G. Diehl, Shanghai (CN)

(73) Assignee: Pony AI Inc., Grand Cayman (KY)

( * ) Notice: Subject to any disclaimer, the term of this patent is extended or adjusted under 35 U.S.C. 154(b) by 0 days.

(21) Appl. No.: 16/818,230

(22) Filed: Mar. 13, 2020

(65) Prior Publication Data

US 2021/0213960 A1 Jul. 15, 2021

Related U.S. Application Data

(60) Provisional application No. 62/960,510, filed on Jan. 13, 2020.

(51) Int. Cl.
*B60W 40/09* (2012.01)
*B60W 50/14* (2020.01)
*G06K 9/00* (2006.01)

(52) U.S. Cl.
CPC ............ *B60W 40/09* (2013.01); *B60W 50/14* (2013.01); *G06K 9/00268* (2013.01); *B60W 2050/143* (2013.01); *B60W 2540/221* (2020.02); *B60W 2540/225* (2020.02); *B60W 2540/229* (2020.02)

(58) Field of Classification Search
CPC .................................................. B60W 40/09
See application file for complete search history.

(56) References Cited

U.S. PATENT DOCUMENTS

| | | | |
|---|---|---|---|
| 8,356,899 B2 | 1/2013 | Hirata | |
| 2014/0139655 A1 | 5/2014 | Mimar | |
| 2016/0270718 A1* | 9/2016 | Heneghan | ............ A61B 5/0022 |
| 2017/0110022 A1* | 4/2017 | Gulash | ................... G08B 23/00 |
| 2018/0284764 A1* | 10/2018 | Asghar | ................ G05D 1/0088 |
| 2019/0225228 A1* | 7/2019 | Gurusubramanian | ....................... G06K 9/00845 |

* cited by examiner

*Primary Examiner* — Qutbuddin Ghulamali
(74) *Attorney, Agent, or Firm* — Sheppard Mullin Richter & Hampton LLP

(57) ABSTRACT

Described herein are systems, methods, and non-transitory computer readable media for assessing an awareness level of a vehicle occupant such as a vehicle operator and taking one or more measures to raise the awareness level of the vehicle occupant if deemed necessary. In particular, if the awareness level of the vehicle occupant falls below a minimum threshold level of awareness for safe vehicle operation, one or more response measures may be taken to raise the awareness level above the threshold level. The awareness level of the vehicle occupant can be quantitatively determined based on a physiological and/or behavioral response of the vehicle occupant to an applied stimulus such as one or more light pulses, an audible sound, or the like.

17 Claims, 6 Drawing Sheets

VEHICLE OPERATOR AWARENESS DETECTION

CROSS-REFERENCE TO RELATED APPLICATION

This application claims the benefit under 35 U.S.C. § 119(e) of U.S. Application No. 62/960,510, filed Jan. 13, 2020, which is hereby incorporated by reference in its entirety.

TECHNICAL FIELD

The present invention relates generally to automated determination of a level of awareness of a vehicle operator, and more particularly, in some embodiments, to determining a level of awareness of a vehicle operator based on sensor data indicative of physiological and/or behavioral characteristics of the vehicle operator.

BACKGROUND

A vehicle, such as an autonomous vehicle (AV), includes a myriad of sensors that provide continuous streams of sensor data captured from the vehicle's surrounding environment. Such sensor data enables an AV to perform a number of functions that would otherwise be performed by a manual human operator including various vehicle navigation tasks such as vehicle acceleration and deceleration, vehicle braking, vehicle lane changing, adaptive cruise control, blind spot detection, rear-end radar for collision warning or collision avoidance, park assisting, cross-traffic monitoring, emergency braking, and automated distance control.

Certain on-board vehicle sensors provide sensor data that bolsters a vehicle's field-of-view such as cameras, light detection and ranging (LiDAR)-based systems, radar-based systems, Global Positioning System (GPS) systems, sonar-based sensors, ultrasonic sensors, accelerometers, gyroscopes, magnetometers, inertial measurement units (IMUs), and far infrared (FIR) sensors. Real-time spatial information can be determined from sensor data captured by such on-board sensors located throughout the vehicle, which may then be processed to calculate various vehicle parameters and determine safe driving operations of the vehicle.

In some scenarios, while an AV may be capable of operating in an autonomous mode without the need for manual control by a human operator, governmental regulations, safety considerations, or the like may necessitate or otherwise call for the presence of a human operator who can take over vehicle control if needed. As such, the level of focus/attentiveness of a human operator is important not only in scenarios in which the human operator is manually controlling the vehicle, but also in autonomous driving scenarios. Described herein are technical solutions that address technical problems relating to performing a quantitative assessment of a human vehicle operator's level of awareness and taking measures, if necessary, to raise the human operator's awareness level.

SUMMARY

In an example embodiment of the invention, a computer-implemented method for determining an awareness level of a vehicle occupant includes presenting a stimulus to the vehicle occupant, capturing sensor data indicative of at least one of a physiological response or a behavioral response of the vehicle occupant to the stimulus, and determining, based at least on an analysis of the sensor data, the awareness level of the vehicle occupant.

In another example embodiment of the invention, a system for determining an awareness level of a vehicle occupant includes at least one processor and at least one memory storing computer-executable instructions. The at least one processor is configured to access the at least one memory and execute the computer-executable instructions to perform a series of operations. In an example embodiment, the series of operations includes presenting a stimulus to the vehicle occupant, capturing sensor data indicative of at least one of a physiological response or a behavioral response of the vehicle occupant to the stimulus, and determining, based at least on an analysis of the sensor data, the awareness level of the vehicle occupant.

In another example embodiment of the invention, a computer program product for determining an awareness level of a vehicle occupant is disclosed. The computer program product includes a non-transitory computer-readable medium readable by a processing circuit, where the non-transitory computer-readable medium stores instructions executable by the processing circuit to cause a method to be performed. In an example embodiment, the method includes presenting a stimulus to the vehicle occupant, capturing sensor data indicative of at least one of a physiological response or a behavioral response of the vehicle occupant to the stimulus, and determining, based at least on an analysis of the sensor data, the awareness level of the vehicle occupant.

Example embodiments of the invention include the following additional features and aspects that can be implemented, in any combination, in connection with the above-described method, system, and/or computer program product.

In an example embodiment of the invention, a method/series of operations further includes analyzing the sensor data to determine a quantitative value representative of a cumulative response level of the vehicle occupant to the stimulus and correlating the quantitative value to the awareness level of the vehicle occupant.

In an example embodiment of the invention, the physiological response of the vehicle occupant includes a contraction of a pupil of the vehicle occupant in response to the stimulus. In an example embodiment of the invention, an amount of the contraction of the pupil is correlated to the awareness level of the vehicle occupant.

In an example embodiment of the invention, the behavioral response of the vehicle occupant includes at least one of a head movement of the vehicle occupant or a closing of an eyelid of the vehicle occupant.

In an example embodiment of the invention, the stimulus is a first stimulus, and a method/series of operations further includes determining that the awareness level of the vehicle occupant fails to satisfy a minimum threshold level of awareness and presenting a second stimulus to the vehicle occupant to raise the awareness level of the vehicle occupant.

In an example embodiment of the invention, the first stimulus is light having a first intensity level and the second stimulus is light having a second intensity level, and the second intensity level is greater than the first intensity level. In an example embodiment of the invention, the first stimulus is a visual stimulus and the second stimulus is an audible stimulus.

In an example embodiment of the invention, a method/series of operations further includes monitoring the vehicle occupant to identify indicia of a potential drop in the awareness level of the vehicle occupant such that presenting the stimulus to the vehicle occupant includes presenting the stimulus responsive, at least in part, to identifying the indicia of a potential drop in the awareness level of the vehicle occupant. In an example embodiment of the invention, monitoring the vehicle occupant includes capturing video data of the vehicle occupant over a period of time and analyzing the video data to identify the indicia of a potential drop in the awareness level of the vehicle occupant.

In an example embodiment of the invention, the vehicle occupant is an operator of a vehicle, and the indicia include at least one of: i) a first duration of time that a gaze direction of the operator of the vehicle is not aligned with a travel direction of the vehicle exceeds a first threshold period of time or ii) a second duration of time that an eyelid of the operator covers more than a threshold amount of an eye of the operator exceeds a second threshold period of time.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
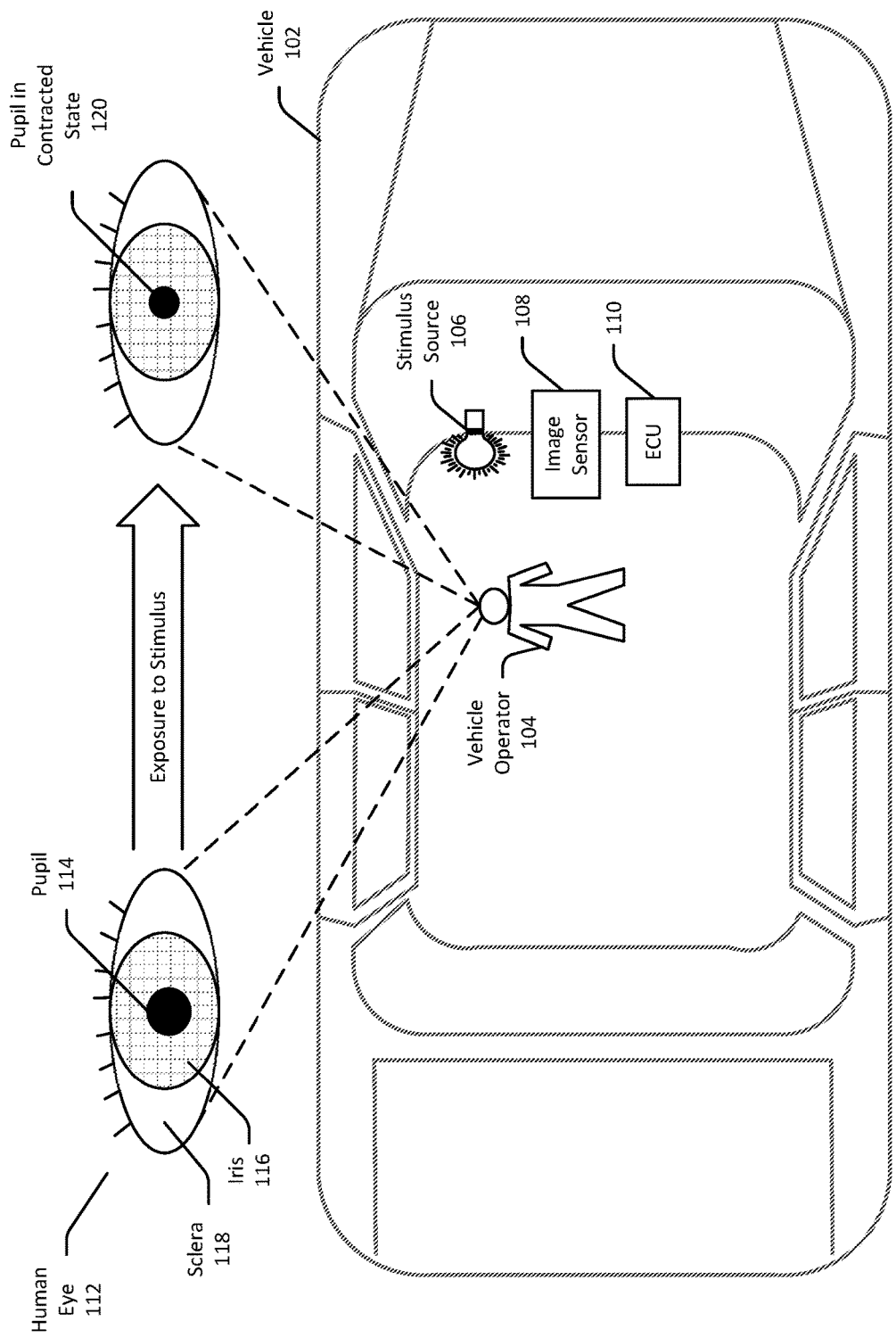
FIG. 1 illustrates an example physiological response of a vehicle occupant to a stimulus in accordance with an example embodiment of the invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises," "comprising," "includes," "including," "contains," or "containing" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents and vice versa unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

A claimed solution rooted in computer technology overcomes problems specifically arising in the realm of computer technology. Described herein is a technical solution rooted in computer technology that overcomes technical problems associated with diminished awareness of an occupant of a moving vehicle such as an operator of the vehicle. More specifically, example embodiments of the invention described herein relate to, among other things, systems, methods, computer-readable media, techniques, and methodologies for assessing an awareness level of a vehicle occupant and taking one or more measures to raise the awareness level of the vehicle occupant if deemed necessary. For instance, in example embodiments, if the awareness level of the vehicle occupant falls below a minimum threshold level of awareness for safe vehicle operation, one or more response measures may be taken to raise the awareness level above the threshold level. The vehicle occupant may be a current human operator of a vehicle or a vehicle passenger having the capability to take over control of an autonomous vehicle (e.g., a human seated in the driver's seat). In other example embodiments, the vehicle occupant may be a passenger seated in the front passenger's seat or a rear passenger seat. For instance, in some example embodiments, it may be desirable to ensure that a passenger other than a vehicle operator has an awareness level above a threshold level so that the passenger can, in turn, monitor the awareness level of the vehicle operator.

In some example embodiments, a stimulus such as a pulse of light may be presented to a vehicle occupant. The pulse of light may have any suitable duration and may be directed towards the vehicle occupant. In some example embodiments, the light pulse may be directed at least partially towards the vehicle occupant's eyes and may have a light intensity above a threshold value. In general, when exposed to a bright light, the human pupil contracts. In some example embodiments, this physiological response can be used, at least in part, to determine a quantitative value representative of the vehicle occupant's response to the applied stimulus (which may be referred to herein at times as a quantitative response value). For instance, in some example embodiments, the amount by which the vehicle occupant's pupil contracts may be proportional to the quantitative response value generated. That is, the greater the extent of the vehicle occupant's pupil contraction, the larger the quantitative value representative of the vehicle occupant's response to the applied stimulus. In example embodiments, a larger quantitative response value may indicate a greater level of responsiveness of the vehicle occupant to the applied stimulus.

In some example embodiments, a behavioral response of the vehicle occupant may be assessed and used, at least in part, to determine the quantitative response value. In some example embodiments, both a behavioral response and a physiological response of the vehicle occupant to the applied stimulus may be assessed and used in conjunction with one another to determine the quantitative response value. Thus, in such example embodiments, the quantitative response value may be representative of a cumulative response of the vehicle occupant to the applied stimulus. In example embodiments, image data, motion detection data, and the like may be captured and analyzed to evaluate the physiological and/or behavioral responses of the vehicle occupant. In some example embodiments, the behavioral response that is assessed may include one or more of a head tilt or other movement of the vehicle occupant; an eyelid closing action of the vehicle occupant; an eye squinting action of the vehicle occupant; or the like. In example embodiments, the magnitude of the behavioral response that is observed may be correlated to the quantitative response value. That is, for example, the greater the degree to which the vehicle occupant squints her eyes in response to the applied stimulus, the larger the quantitative response value.

In some example embodiments, a physiological response of a vehicle occupant to an applied stimulus may not be present. For example, if a vehicle operator's gaze direction is not aligned with the vehicle travel direction, the direction in which the stimulus is applied may not coincide with the operator's gaze direction, and as such, the vehicle operator may not exhibit an observable physiological response to the applied stimulus. In such example embodiments, however, behavioral actions of the vehicle operator may be assessed to generate the quantitative response value. In some example embodiments, image data of the vehicle operator may be captured during a period that includes a duration of the applied stimulus. Vehicle operator actions such as head movement/tilting, lack of eye squinting, or the like may indicate that the vehicle operator is not exhibiting a safe level of awareness, and thus, may result in a lower quantitative response value.

In example embodiments, once determined, the quantitative response value may be correlated to an awareness level of the vehicle occupant (e.g., vehicle operator) being assessed. In some example embodiments, specific ranges of quantitative response values may correlate to corresponding awareness levels. For instance, as a non-limiting example, the quantitative response value may range from 0 to 100. A quantitative response value from 0 to 33 may correspond to a low awareness level that is potentially unsafe; a quantitative response value between 34 and 66 may correspond to an average awareness level that may indicate a potential concern but which may not yet be unsafe; and a quantitative response value between 67 and 100 may be indicative of a high level of awareness that does not present any risk of unsafe vehicle operation. It should be appreciated that these example ranges of quantitative values and awareness levels to which they correspond are merely illustrative and not exhaustive. For instance, in other example embodiments, there may be a greater number of awareness levels, where each one corresponds to a smaller range of potential quantitative response values. This may provide a more granular assessment of the vehicle occupant's awareness level. Moreover, in some example embodiments, the quantitative response value may be provided as input to a classifier or the like (e.g., a statistical model) that outputs the corresponding awareness level.

In example embodiments, the determined awareness level of the vehicle occupant may be compared to a threshold awareness level to determine whether the awareness level is potentially unsafe and whether one or more measures should be initiated to attempt to raise the awareness level. For example, if the determined awareness level is below a minimum threshold level of awareness required to ensure safe vehicle operation, one or more measures may be initiated to raise the vehicle occupant's awareness level. Such measures may include, without limitation, outputting a loud audible sound or computer-generated speech; providing a tactile output (e.g., vibrating a steering wheel); outputting one or more bright flashes of light; temporarily increasing the amount of air being blown out from one or more air vents in the vehicle; adjusting a temperature of air being out from the vents; or the like.

Rather than correlating the quantitative response value to an awareness level and then comparing the awareness level to a minimum threshold level of awareness to determine whether to initiate one or more awareness level raising measures, in some example embodiments, the quantitative response value may be directly compared to a threshold value to determine whether to initiate the awareness level raising measures. For example, if the quantitative response value can range from 0 to 100, the minimum threshold value may be 25. According to this non-limiting example, one or more measures may be taken to attempt to raise the awareness level for any quantitative response values that are below the minimum threshold value of 25.

Various embodiments of the invention overcome technical problems specifically arising in the realm of computer-based automotive technology. In particular, example embodiments of the invention provide technical solutions to technical problems relating to the operation and control of vehicles, specifically, the technical problem of ensuring that a vehicle operator's awareness level is above a minimum awareness level required to ensure safe vehicle operation. The technical solution is provided in the form of a computer-based solution that: 1) applies a stimulus to a vehicle operator, 2) captures sensor data indicative of a physiological and/or behavioral response of the vehicle operator to the stimulus, 3) analyzes the sensor data to determine a quantitative response value indicative of a cumulative response of the vehicle operator to the stimulus, 4) correlates the quantitative response value to an awareness level of the vehicle operator, 5) compares the awareness level (or the quantitative response value itself) to a threshold awareness level (or other threshold value) to determine whether initiate one or more measures to raise the awareness level, and 6) initiate the one or more awareness level raising measures if determined to be warranted. This technical solution eliminates the technical problem of diminished vehicle operator awareness due to fatigue or the like by ensuring that the awareness level of a vehicle operator is continuously or periodically determined based on captured sensor data indicative of the vehicle operator's behavioral and/or physiological responses to an applied stimulus, and that measures are taken to raise the operator's awareness level if it is too low. Thus, the above-described technical solution constitutes a technological improvement that is necessarily rooted in computer-based automotive technology. This technical solution according to example embodiments of the invention also has applicability to autonomous vehicle contexts by ensuring that even though a vehicle occupant may not currently be operating a vehicle, that he has a suitable awareness level to take control of the autonomous vehicle if needed. Thus, this technical solution also constitutes an improvement to autonomous vehicle technology in particular.

FIG. 1 illustrates an example physiological response of a vehicle occupant to a stimulus in accordance with an example embodiment of the invention. FIG. 1 illustrates an example vehicular operation context according to which a vehicle 102 may be operated by a vehicle operator 104. In some example embodiments, the vehicle 102 may be operating in an autonomous mode, in which case, the vehicle operator 104 may be a vehicle occupant who is not currently operating the vehicle, but who has the capability to override autonomous operation of the vehicle 102 and take over operational control of the vehicle 102.

The vehicle 102 may include or otherwise be integrated or communicatively coupled with a stimulus source 106, one or more image sensors 108, and an electronic control unit (ECU) 110. The stimulus source 106 may be configured to present a stimulus to the vehicle operator 104. In some example embodiments, the stimulus source 106 may be a light source such as a laser, a lamp, or the like that is configured to emit light. The light may be emitted periodically as pulses of light having any suitable duration. In other example embodiments, the stimulus source 106 may emit light continuously for a specified duration. In certain example embodiments, the stimulus source 106 may emit light having at least a threshold intensity level in order to increase the likelihood that the light is detected by the vehicle operator 104 and elicits a physiological and/or behavioral response from the vehicle operator 104. In other example embodiments, the stimulus source 106 may be a speaker or the like and the stimulus emitted from the stimulus source 106 may be an audible sound. The audible sound may be a computer-generated tone or other sound; a computer-generated natural language word or phrase; a pre-recorded human voice stating a word or phrase; or the like.

In example embodiments, the image sensor 108 may be configured to monitor and capture image data of an interior of the vehicle 102. More specifically, the image sensor 108 may capture still image and/or video image data of the vehicle operator 104. The image data captured by the image sensor 108 may be indicative of a physiological and/or behavioral response of the vehicle operator 104 to a stimulus presented by the stimulus source 106. In some example embodiments, the image data may be indicative of behavior of the vehicle operator 104 over a period of time, where such behavior may not necessarily occur in response to the applied stimulus. For instance, the image data may reflect behaviors of the vehicle operator 104 such as head tilting/movement, eyelid closing, or the like that may be indicative of a diminished awareness level for the vehicle operator 104.

In example embodiments, the physiological response of the vehicle operator 104 to the stimulus presented by the stimulus source 106 may be a contraction of a pupil 114 of the vehicle operator 104. An example human eye 112 is depicted in FIG. 1. The eye 112 may be representative of an eye of the vehicle operator 104. The eye 112 includes a sclera 118 and an iris 116. The sclera 118 is an opaque, fibrous, protective, outer layer of the human eye 112. The iris 116 is a thin, circular structure in the eye 112 that is responsible for controlling the diameter and size of the pupil 114, and thus, the amount of light that reaches the retina (not shown) of the eye 112.

In example embodiments, the vehicle operator 104 may exhibit a physiological response when exposed to a stimulus from the stimulus source 106. For example, in response to exposure to a pulse of light, a series of light pulses, or the like emitted from the stimulus source 106, the vehicle operator 104 may exhibit a physiological response in the form of a contraction of the pupil 114. FIG. 1 depicts the pupil 114 in a contracted state 120 in response to exposure to an applied stimulus from the stimulus source 106. In some example embodiments, the extent to which the pupil 114 contracts (i.e., the difference in size between the pupil 114 in the contracted state 120 and the pupil 114 in its normal state) may be correlated to an awareness level of the vehicle operator 104. For instance, the greater the extent of contraction of the pupil 114 in response to the applied stimulus, the greater than quantitative response value, and thus, the higher the awareness level of the vehicle operator 104.

Figure 2:
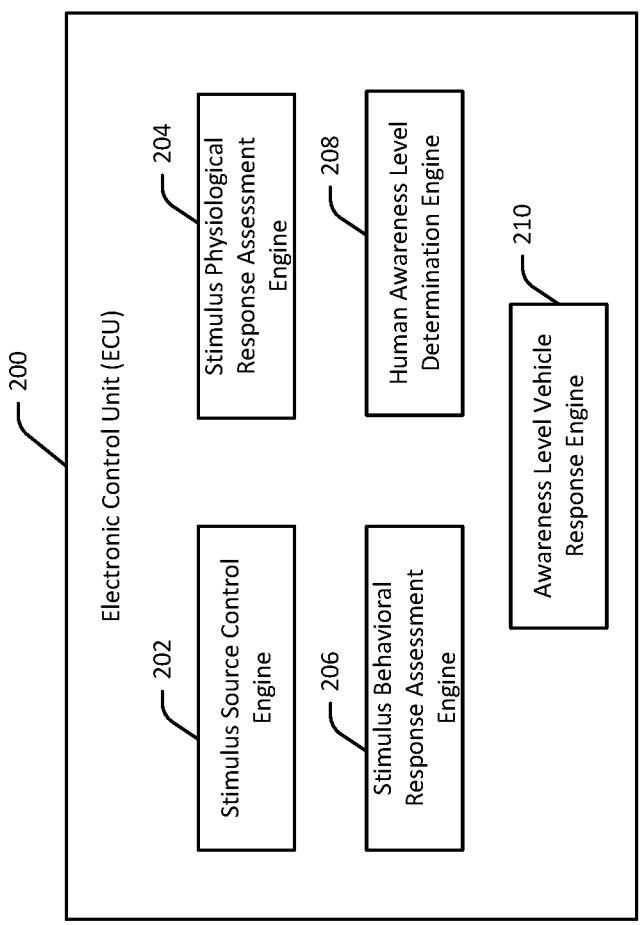
FIG. 2 is a schematic block diagram of an electronic control unit configured to perform a human awareness level assessment in accordance with an example embodiment of the invention.

FIG. 2 is a schematic block diagram of an electronic control unit configured to perform a human awareness level assessment in accordance with an example embodiment of the invention. The electronic control unit (ECU) 200 depicted in FIG. 2 may be an example implementation of the ECU 110 depicted in FIG. 1. In example embodiments, the ECU 200 may include various engines configured to perform various functions in connection with the assessment of an awareness level of a vehicle occupant (e.g., the vehicle operator 104). These engines may include a stimulus source control engine 202, a stimulus physiological response assessment engine 204, a stimulus behavioral response assessment engine 206, a human awareness level determination engine 208, and an awareness level vehicle response engine 210.

In example embodiments, the stimulus source control engine 202 may be configured to control the stimulus source 106 to emit the stimulus (e.g., a pulse of light, an audible sound, etc.). In example embodiments, the stimulus source control engine 202 may be configured to, for example, adjust an intensity of the stimulus emitted by the stimulus source 106, adjust a duration of time over which the stimulus is emitted, switch between different stimulus sources to emit different stimuli, control the number of times a stimulus is presented over a period of time, and so forth.

In example embodiments, the stimulus physiological response assessment engine 204 may be configured to evaluate sensor data (e.g., image data) and assess a physiological response of a vehicle occupant (e.g., the vehicle operator 104) to an applied stimulus. For example, the stimulus physiological response assessment engine 204 may be configured to evaluate image data to determine an amount of contraction of a pupil of a vehicle occupant in response to a stimulus. Further, in some example embodiments, the stimulus physiological response assessment engine 204 may be configured to determine a quantitative response value based at least in part on its assessment of the physiological response of the vehicle occupant.

In example embodiments, the stimulus behavioral response assessment engine 206 may be configured to evaluate sensor data (e.g., image data) and assess a behavioral response of a vehicle occupant to an applied stimulus. In example embodiments, the behavioral response may be, for example, eye squinting that occurs in response to a light stimulus. In certain example embodiments, the stimulus behavioral response assessment engine 206 may evaluate other behaviors of a vehicle occupant which may not occur in response to presentation of a stimulus, but which may nonetheless be indicative of an awareness level of the vehicle occupant. For example, the stimulus behavioral response assessment engine 206 may evaluate image data of a vehicle occupant to determine whether the occupant is exhibiting various behaviors (e.g., head tilting/movement, eyelid closing, etc.) that may be indicative of a diminished awareness level. In example embodiments, the stimulus behavioral response assessment engine 206 may be configured to determine a quantitative response value for the vehicle occupant based at least in part on its assessment of behavioral responses of the vehicle occupant.

In example embodiments, the human awareness level determination engine 208 may be configured to receive assessment data from the stimulus physiological response assessment engine 204 and/or from the stimulus behavioral response assessment engine 206 and determine a corresponding awareness level for a vehicle occupant who is being evaluated. In some example embodiments, the human awareness level determination engine 208 may receive the assessment data from the engines 204, 206 and may generate a corresponding quantitative response value indicative of a cumulative response of a vehicle occupant to an applied stimulus. As previously noted, it should be appreciated that the quantitative response value may include a quantitative assessment of behaviors of the vehicle occupant, some of which may not occur in response to an applied stimulus, but which may nonetheless be indicative of an awareness level of the vehicle occupant. In other example embodiments, the engines 204, 206 may provide respective quantitative response values to the human awareness level determination engine 208, which in turn, may aggregate these values in some manner to generate the quantitative response value that is representative of the cumulative response of the vehicle occupant who is being evaluated. In example embodiments, the human awareness level determination engine 208 may be configured to correlate the quantitative response value to an awareness level for the vehicle occupant who is being evaluated. As previously noted, a given range of quantitative response values may correspond to a given awareness level.

In example embodiments, the awareness level vehicle response engine 210 may be configured to initiate one or more measures to raise an awareness level of a vehicle occupant. For example, in some example embodiments, the human awareness level determination engine 208 of the awareness level vehicle response engine 210 may be configured to compare a determined awareness level for a vehicle occupant against a minimum threshold awareness level for ensuring safe vehicle operation. If the determined awareness level fails to meet the minimum threshold awareness level, the awareness level vehicle response engine 210 may initiate one or more measures to attempt to raise the awareness level of the vehicle occupant such as presenting a light above a threshold light intensity to the vehicle occupant; presenting an audible sound above a threshold sound intensity to the vehicle occupant; providing a tactile output to the vehicle occupant; and so forth. In some example embodiments, the light (or sound) presented to the vehicle occupant to raise her awareness level may have a greater intensity than a light (or sound) presented to the vehicle occupant as the initial stimulus for assessing the vehicle occupant's physiological and/or behavioral responses.

Figure 3:
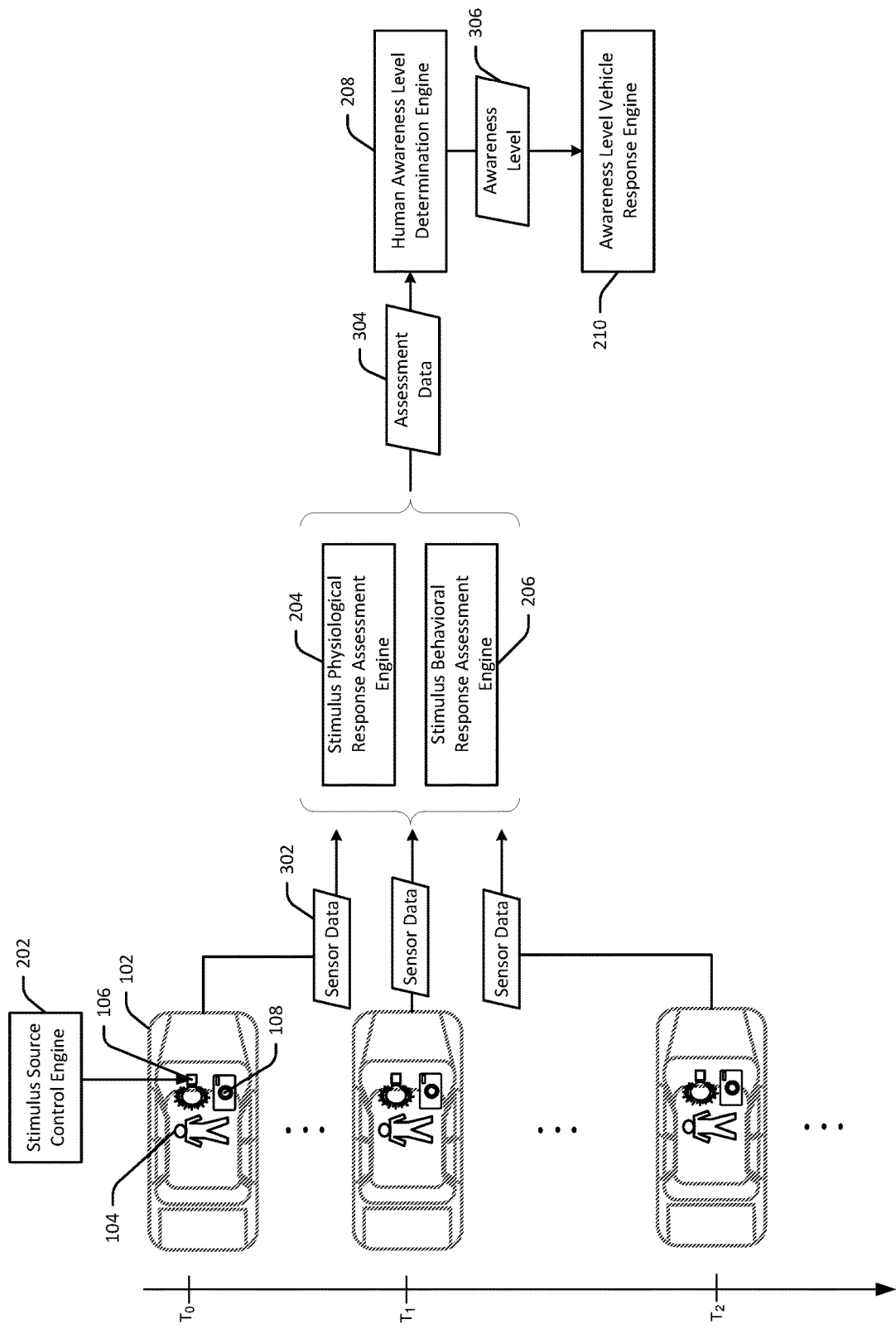
FIG. 3 schematically illustrates determining a human awareness level based on an assessment of human physiological and/or behavioral responses to a stimulus and potentially taking one or more measures to raise the awareness level in accordance with an example embodiment of the invention.
Figure 4:
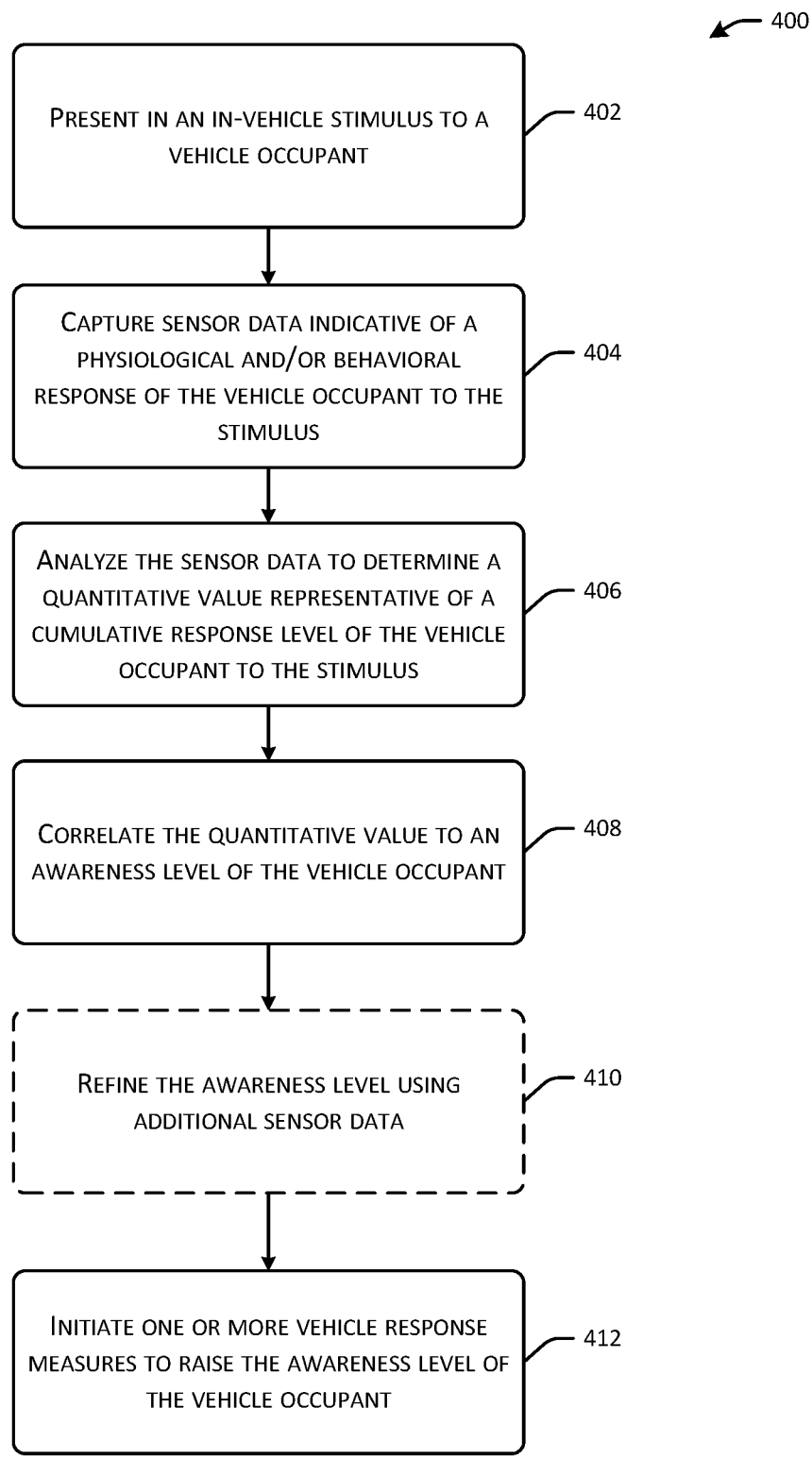
FIG. 4 is a process flow diagram of an illustrative method for determining a human awareness level based on an assessment of human physiological and/or behavioral responses to a stimulus and potentially taking one or more measures to raise the awareness level in accordance with an example embodiment of the invention.

FIG. 3 schematically illustrates determining a human awareness level based on an assessment of human physiological and/or behavioral responses to a stimulus and potentially taking one or more measures to raise the awareness level in accordance with an example embodiment of the invention. FIG. 4 is a process flow diagram of an illustrative method 400 for determining a human awareness level based on an assessment of human physiological and/or behavioral responses to a stimulus and potentially taking one or more measures to raise the awareness level in accordance with an example embodiment of the invention. FIGS. 3 and 4 will be described in conjunction with one another hereinafter.

Figure 5:
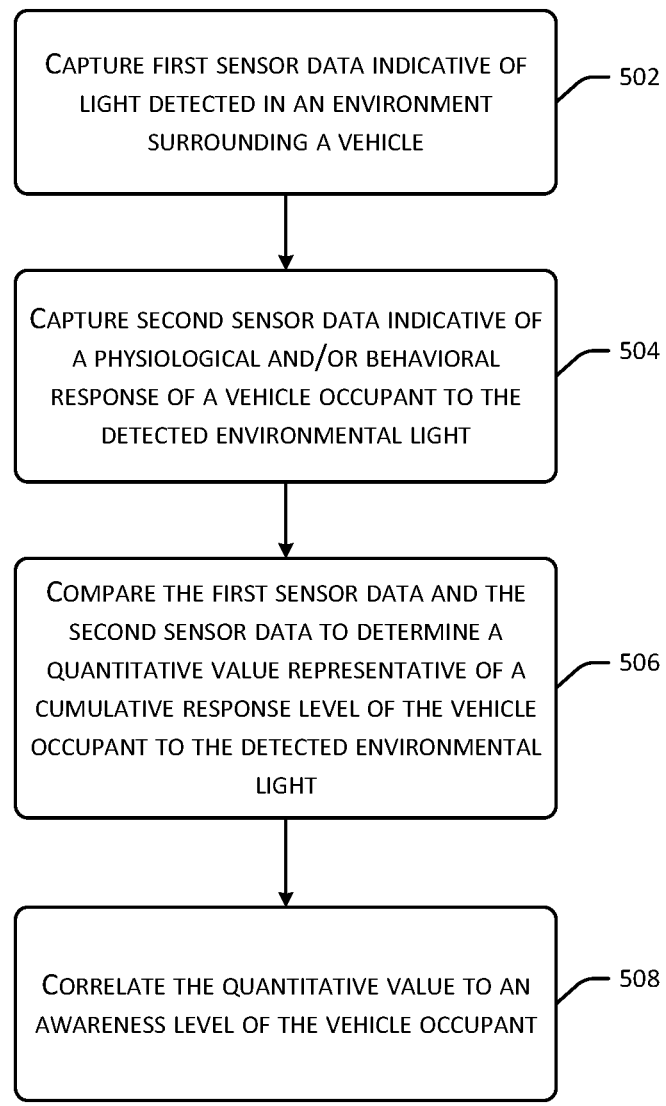
FIG. 5 is a process flow diagram of an illustrative method for determining a human awareness level based on an assessment of human physiological and/or behavioral responses to environmental light in accordance with an example embodiment of the invention.
Figure 6:
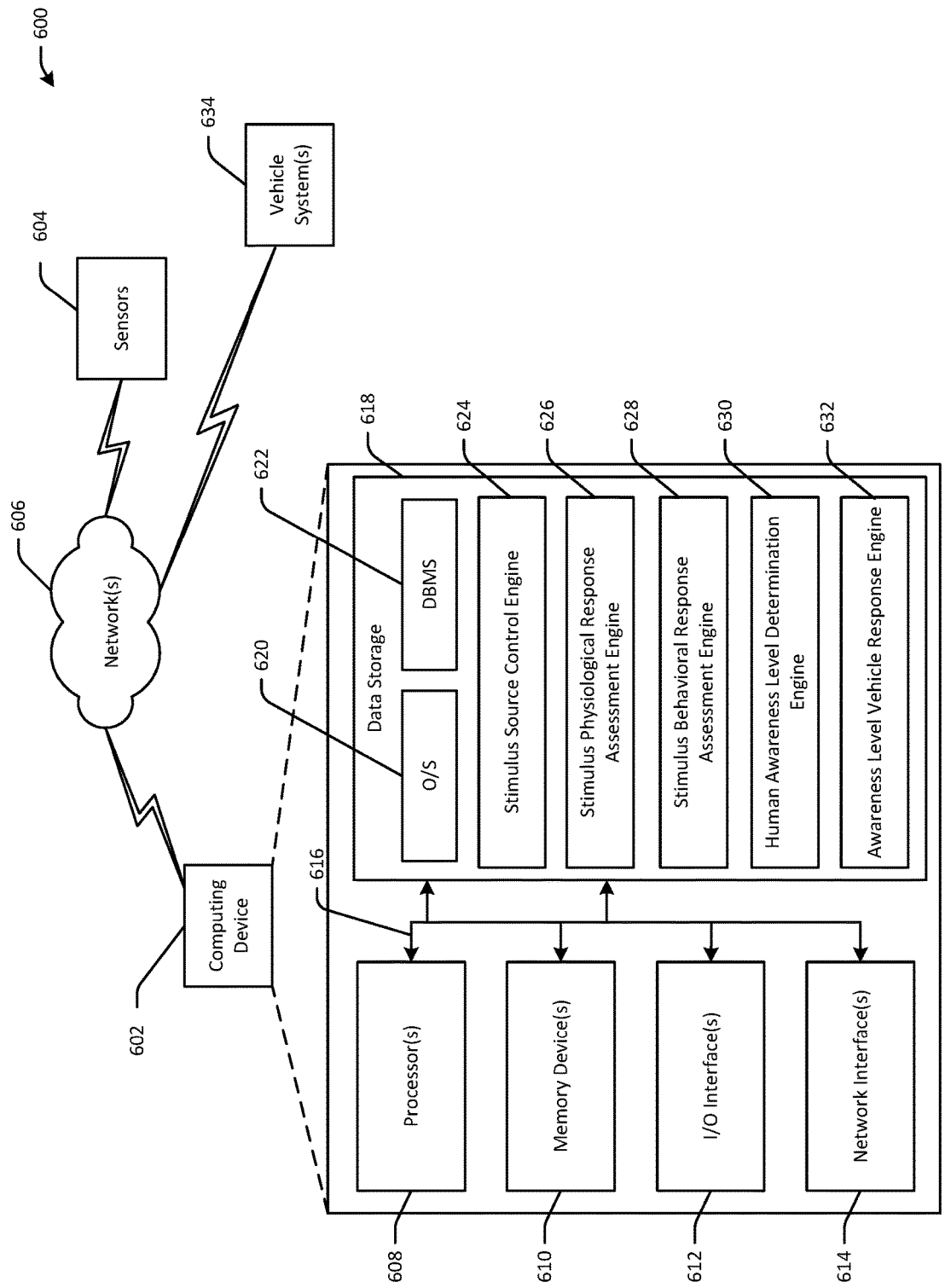
FIG. 6 is a schematic block diagram illustrating an example networked architecture configured to implement example embodiments of the invention.

Each operation of the method 400 and/or the method 500 (depicted in FIG. 5 and described in more detail later in this disclosure) can be performed by one or more of the engines or the like such as those depicted in FIG. 2, 3, or 6. These engines can be implemented in any combination of hardware, software, and/or firmware. In certain example embodiments, one or more of these engines can be implemented, at least in part, as software and/or firmware modules that include computer-executable instructions that when executed by a processing circuit cause one or more operations to be performed. In example embodiments, these engines may be customized computer-executable logic implemented within a customized computing chip such as an FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Referring now to FIG. 4 in conjunction with FIG. 3, at block 402 of the method 400, an in-vehicle stimulus may be presented to a vehicle occupant. For example, the stimulus source control engine 202 may control the stimulus source 106 to present a stimulus (e.g., one or more pulses of light) to the vehicle operator 104 of the vehicle 102.

At block 404 of the method 400, sensor data 302 indicative of a physiological and/or behavioral response of the vehicle occupant to the stimulus may be captured. For example, the image sensor 108 may capture image data of the vehicle operator 104 over a period of time during which the stimulus is presented to the vehicle operator 104. Then, at block 406 of the method 400, the sensor data 302 may be analyzed to determine a quantitative response value representative of a cumulative response level of the vehicle occupant to the applied stimulus.

More specifically, in example embodiments, the sensor data 302 may be received as input by the stimulus physiological response assessment engine 204 and by the stimulus behavioral response assessment engine 206. In some example embodiments, the stimulus physiological response assessment engine 204 may assess a physiological response of a vehicle occupant to an applied stimulus and generate a corresponding quantitative response value. For example, the engine 204 may determine the extent to which the pupil 114 of the vehicle operator 104 contracts in response to a stimulus in the form of a pulse of light and generate a quantitative response value that is representative, at least in part, of the extent of the pupil contraction. Similarly, the stimulus behavioral response assessment engine 206 may evaluate various behaviors of the vehicle operator 104 and generate a corresponding quantitative response value that is reflective of the observed behaviors. For example, the engine 206 may evaluate the extent of head tilt/movement of the vehicle operator 104, the extent to which the vehicle operator 104 squints her eyes, and so forth, and generate a quantitative response value based on this evaluation.

In some example embodiments, these individually determined quantitative response values may be provided as assessment data 304 to the human awareness level determination engine, which in turn, may combine or otherwise aggregate the respective quantitative response values generated by the engines 204, 206 to generate a cumulative quantitative response value representative of a cumulative response of the vehicle operator 104 to the stimulus. In other example embodiments, the human awareness level determination engine 208 may be configured to generate the quantitative response value representative of the cumulative response level of the vehicle operator 104 directly from the assessment data 304.

For example, the assessment data 304 may include data indicative of a physiological response of the vehicle operator 104 (e.g., the amount of contraction of the pupil 114 in response to an applied stimulus, the duration of contraction of the pupil 114, the amount by which an eyelid of the vehicle operator 104 opens in response to the applied stimulus, etc.). In addition, the assessment data 304 may include data indicative of a behavioral response of the vehicle operator 104 to an applied stimulus (e.g., the extent to which the vehicle operator 104 squints his eyes) and/or data indicative of behaviors of the vehicle operator 104 generally (e.g., the extent of head movement/tilt, the extent to which eyelids of the vehicle operator 104 are closed, the duration for which the vehicle operator's 104 eyelids cover more than a threshold portion of the eye, etc.). The human awareness level determination engine 208 may be configured to analyze the assessment data 304 and quantify the data contained therein to obtain the quantitative response value.

At block 408 of the method 400, the human awareness level determination engine 208 may be configured to correlate the quantitative response value generated at block 406 to an awareness level 306 of the vehicle occupant. For example, the range of all possible values that the quantitative response value may take on can be divided into multiple sub-ranges of values, where each such sub-range of values may be correlated to a corresponding awareness level. At optional block 410 of the method 400, the awareness level 306 may be refined based on additional sensor data that is captured. For instance, a stimulus may be presented to the vehicle operator 104 multiple times and a respective quantitative cumulative response value may be generated in connection with each stimulus. An average or median value of the quantitative response values may then be determined and correlated to an awareness level.

At block 412 of the method 400, the awareness level vehicle response engine 210 may initiate one or more vehicle response measures to raise the awareness level 306 of the vehicle operator 104. In particular, in example embodiments, the human awareness level determination engine 208 (or the awareness level vehicle response engine 210) may compare the awareness level 306 to a threshold awareness level that is representative of a minimum awareness level that ensures safe vehicle operation. If the awareness level 306 fails to meet this minimum awareness level, then the awareness level vehicle response engine 210 may initiate the one or more measures to raise the awareness level 306. Such measures may include, without limitation, outputting a loud audible sound or computer-generated speech; providing a tactile output (e.g., vibrating a steering wheel); outputting one or more bright flashes of light; temporarily increasing the amount of air being blown out from one or more air vents in the vehicle; or the like. In some example embodiments, the awareness level 306 may not be compared to a threshold awareness level. Rather, in some example embodiments, the quantitative response value may be directly compared to a threshold value to determine whether to initiate the measure(s) for raising the awareness level 306.

In example embodiments, the minimum threshold awareness level that serves the demarcation point between an awareness level that poses an acceptable risk with respect to vehicle operation and an awareness level that does not may be determined based at least in part on historical data. Such historical data may include historical awareness levels and/or corresponding quantitative response values determined with respect to previously applied stimuli as well as historical accident data. The historical awareness levels/quantitative response values may be assessed (potentially offline) to determine what awareness level resulted in an accident rate below a threshold rate (e.g., $1/10^6$). The awareness level that results in an accident rate below a desired threshold rate may then be selected as the minimum threshold awareness level. In some example embodiments, the minimum threshold awareness level may be determined using a machine learning technique. For instance, a machine learning model (e.g., a convolutional neural network) can be trained on an input ground-truth dataset and may, once trained, output a minimum threshold awareness level for given physiological/behavioral assessment data.

In other example embodiments, psychological/behavioral analysis may be used to determine the minimum threshold awareness level. For instance, psychological/behavioral analysis may indicate which physiological and/or behavioral actions are more likely to result in potentially unsafe vehicle operation. The psychological/behavioral analysis may reveal the number, type, and/or extent of physiological and/or behavioral actions/events that need to be observed in order for the risk of unsafe vehicle operation to become unacceptable, thereby triggering one or more awareness level raising measures. The number, type, and/or extent of physiological and/or behavioral actions/events that need to be observed in order for the risk of unsafe vehicle operation to become unacceptable may constitute the minimum threshold awareness level.

In some example embodiments, the measure for raising the awareness level 306 may be of a same type as the applied stimulus but of a different magnitude. For example, if the stimulus is a light pulse having a first light intensity, the measure for raising the awareness level 306 may be a light pulse having a second light intensity that is greater than the first light intensity. As another non-limiting example, if the stimulus is an audible sound having a first sound intensity, the measure for raising the awareness level 306 may be another sound having a second sound intensity that is greater than the first sound intensity. In other example embodiments, the measure for raising the awareness level 306 may be of a different type than the stimulus. For instance, the stimulus may be a visual stimulus (e.g., a pulse of light), while the measure for raising the awareness level 306 may be an audible stimulus.

In some example embodiments, the behavior of a vehicle occupant (e.g., the vehicle operator 104) may be monitored over time to identify any indicia of a potential drop in the awareness level of the vehicle occupant. For example, image data of the vehicle operator 104 captured over time may be assessed by the engine 206 to determine if any indicia are present that indicate a potential drop in the awareness level of the vehicle operator 104. Such indicia may include, without limitation, a head tilt/movement of the vehicle operator 104 by more than a threshold amount or angle; a gaze direction of the vehicle operator 104 not being aligned with a direction of travel of the vehicle 102 for more than a threshold duration of time; a duration of time that an eyelid of the operator 104 covers more than a threshold amount of an eye of the operator exceeding a threshold period of time; or the like. In example embodiments, the stimulus presented at block 402 of the method 400 may be presented responsive to determining that such indicia are present.

FIG. 5 is a process flow diagram of an illustrative method 500 for determining a human awareness level based on an assessment of human physiological and/or behavioral responses to environmental light in accordance with an example embodiment of the invention.

At block 502 of the method 500, first sensor data may be captured. The first sensor data may be indicative of light detected in an environment surrounding a vehicle. For instance, the first sensor data may be indicative of environmental or ambient light present in a surrounding environment of the vehicle, and which is observable/detectable by an occupant of the vehicle such as a vehicle operator. At block 504 of the method 500, second sensor data may be captured. The second sensor data may be indicative of a physiological and/or behavioral response of the vehicle occupant to the detected environmental light. The physiological and/or behavioral responses of the vehicle occupant may include any of those previously described.

At block 506 of the method 500, the second sensor data and the first sensor data may be compared to determine a quantitative value representative of a cumulative response level of the vehicle occupant to the detected environmental light. The quantitative value representative of the cumulative response level of the vehicle occupant may be indicative of the degree to which the vehicle occupant reacts to the environment light, and thus, may be based, at least in part, on the intensity of the environmental light. Then, at block 508 of the method 500, the quantitative value generated at block 506 may be correlated to an awareness level of the vehicle occupant. Further, although not shown in FIG. 5, one or more measures for raising the awareness level of the vehicle occupant may be initiated if the awareness level does not meet a minimum threshold awareness level deemed necessary for ensuring safe vehicle operation.

Hardware Implementation

FIG. 6 is a schematic block diagram illustrating an example networked architecture 600 configured to implement example embodiments of the invention. The networked architecture 600 can include one or more special-purpose computing devices 602 communicatively coupled via one or more networks 606 to various sensors 604. In example embodiments, the computing device(s) 602 may include the ECU 108 depicted in FIG. 1 or may be otherwise communicatively coupled thereto. The sensors 604 may include any of the example types of on-board vehicle sensors previously described including, without limitation, LiDAR sensors, radars, cameras, GPS receivers, sonar-based sensors, IMUs, accelerometers, gyroscopes, magnetometers, FIR sensors, and so forth. In example embodiments, the sensors 604 may include any of the types of audio capture devices 104 previously described including microphones, ultrasonic sensors, or the like. The special-purpose computing device(s) 602 may include devices that are integrated with a vehicle and may receive sensor data from the sensors 604 via a local network connection (e.g., WiFi, Bluetooth, Dedicated Short Range Communication (DSRC), or the like). In other example embodiments, the special-purpose computing device(s) 602 may be provided remotely from a vehicle and may receive the sensor data from the sensors 604 via one or more long-range networks. In addition, the computing device(s) 602 may be communicatively coupled to one or more vehicle systems 634 via the network(s) 606. The vehicle system(s) 634 may include an in-vehicle infotainment system, other mechanical and/or electrical systems of a vehicle, and so forth.

The special-purpose computing device(s) 602 may be hard-wired to perform the techniques described herein; may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The special-purpose computing device(s) 602 may also combine custom hard-wired logic, ASICs, or FPGAs with custom programming to accomplish the techniques. The special-purpose computing device(s) 602 may be desktop computer systems, server computer systems, portable computer systems, handheld devices, networking devices or any other device or combination of devices that incorporate hard-wired and/or programmed logic to implement the techniques.

The special-purpose computing device(s) may be generally controlled and coordinated by operating system software 620, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device(s) 602 may be controlled by a proprietary operating system. The operating system software 620 may control and schedule computer processes for execution; perform memory management; provide file system, networking, and I/O services; and provide user interface functionality, such as a graphical user interface ("GUI").

While the computing device(s) 602, the sensors 604, and/or the vehicle system(s) 634 may be described herein in the singular, it should be appreciated that multiple instances of any such component can be provided and functionality described in connection any particular component can be distributed across multiple instances of such a component. In certain example embodiments, functionality described herein in connection with any given component of the architecture 600 can be distributed among multiple components of the architecture 600. For example, at least a portion of functionality described as being provided by a computing device 602 may be distributed among multiple such computing devices 602.

The network(s) 606 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 606 can have any suitable communication range associated therewith and can include, for example, global networks (e.g., the Internet), metropolitan area networks (MANs), wide area networks (WANs), local area networks (LANs), or personal area networks (PANs). In addition, the network(s) 606 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 602 can include one or more processors (processor(s)) 608, one or more memory devices 610 (generically referred to herein as memory 610), one or more input/output ("I/O") interface(s) 612, one or more network interfaces 614, and data storage 618. The computing device 602 can further include one or more buses 616 that functionally couple various components of the computing device 602. The computing device 602 may also include various engines including a stimulus source control engine 624, a stimulus physiological response assessment engine 626, a stimulus behavioral response assessment engine 628, a human awareness level determination engine 630, and an awareness level vehicle response engine 632. These engines may be implemented in any combination of software, hardware, or firmware. While these engines are illustratively depicted as software/firmware modules stored in the data storage 618, it should be appreciated that the engines may include hardwired logic, customized logic of a persistently programmed customized computing device such as an ASIC or FPGA, or the like. Each of the engines may include logic for performing any of the functionality described earlier in connection with correspondingly named engines depicted in FIGS. 2 and 3.

The bus(es) 616 can include at least one of a system bus, a memory bus, an address bus, or a message bus, and can permit the exchange of information (e.g., data (including computer-executable code), signaling, etc.) between various components of the computing device 602. The bus(es) 616 can include, without limitation, a memory bus or a memory controller, a peripheral bus, an accelerated graphics port, and so forth. The bus(es) 616 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 610 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 610 can include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 610 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.).

The data storage 618 can include removable storage and/or non-removable storage including, but not limited to, magnetic storage, optical disk storage, and/or tape storage. The data storage 618 can provide non-volatile storage of computer-executable instructions and other data. The memory 610 and the data storage 618, removable and/or non-removable, are examples of computer-readable storage media (CRSM) as that term is used herein. The data storage 618 can store computer-executable code, instructions, or the like that can be loadable into the memory 610 and executable by the processor(s) 608 to cause the processor(s) 608 to perform or initiate various operations. The data storage 618 can additionally store data that can be copied to memory 610 for use by the processor(s) 608 during the execution of the computer-executable instructions. Moreover, output data generated as a result of execution of the computer-executable instructions by the processor(s) 608 can be stored initially in memory 610 and can ultimately be copied to data storage 618 for non-volatile storage.

More specifically, the data storage 618 can store one or more operating systems (O/S) 620 and one or more database management systems (DBMS) 622 configured to access the memory 610 and/or one or more external datastore(s) potentially via one or more of the networks 606. In addition, the data storage 618 may further store one or more program modules, applications, engines, computer-executable code, scripts, or the like. For instance, any of the engines described herein may be implemented as software and/or firmware that includes computer-executable instructions (e.g., computer-executable program code) loadable into the memory 610 for execution by one or more of the processor(s) 608 to perform any of the techniques described herein.

Although not depicted in FIG. 6, the data storage 618 can further store various types of data utilized by engines of the computing device 602. Such data may include, without limitation, sensor data, assessment data, or the like. Any data stored in the data storage 618 can be loaded into the memory 610 for use by the processor(s) 608 in executing computer-executable program code. In addition, any data stored in the data storage 618 can potentially be stored in one or more external datastores that are accessible via the DBMS 622 and loadable into the memory 610 for use by the processor(s) 608 in executing computer-executable instructions/program code.

The processor(s) 608 can be configured to access the memory 610 and execute computer-executable instructions/program code loaded therein. For example, the processor(s) 608 can be configured to execute computer-executable instructions/program code of the various program modules to cause or facilitate various operations to be performed in accordance with one or more embodiments of the invention. The processor(s) 608 can include any suitable processing unit capable of accepting data as input, processing the input data in accordance with stored computer-executable instructions, and generating output data. The processor(s) 608 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 608 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 608 can be made capable of supporting any of a variety of instruction sets.

Referring now to other illustrative components depicted as being stored in the data storage 618, the O/S 620 can be loaded from the data storage 618 into the memory 610 and can provide an interface between other application software executing on the computing device 602 and hardware resources of the computing device 602. More specifically, the O/S 620 can include a set of computer-executable instructions for managing hardware resources of the computing device 602 and for providing common services to other application programs. In certain example embodiments, the O/S 620 can include or otherwise control execution of one or more of the program modules stored in the data storage 618. The O/S 620 can include any operating system now known or which can be developed in the future including, but not limited to, any server operating system, any mainframe operating system, or any other proprietary or non-proprietary operating system.

The DBMS 622 can be loaded into the memory 610 and can support functionality for accessing, retrieving, storing, and/or manipulating data stored in the memory 610, data stored in the data storage 618, and/or data stored in external datastore(s). The DBMS 622 can use any of a variety of database models (e.g., relational model, object model, etc.) and can support any of a variety of query languages. The DBMS 622 can access data represented in one or more data schemas and stored in any suitable data repository. Datastore(s) that may be accessible by the computing device 602 via the DBMS 622, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 602, the input/output (I/O) interface(s) 612 can facilitate the receipt of input information by the computing device 602 from one or more I/O devices as well as the output of information from the computing device 602 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 602 or can be separate therefrom. The I/O devices can further include, for example, any number of peripheral devices such as data storage devices, printing devices, and so forth.

The I/O interface(s) 612 can also include an interface for an external peripheral device connection such as universal serial bus (USB), FireWire, Thunderbolt, Ethernet port or other connection protocol that can connect to one or more networks. The I/O interface(s) 612 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 602 can further include one or more network interfaces 614 via which the computing device 602 can communicate with any of a variety of other systems, platforms, networks, devices, and so forth. The network interface(s) 614 can enable communication, for example, with the sensors 504 and/or one or more other devices via one or more of the network(s) 606. In example embodiments, the network interface(s) 614 provide a two-way data communication coupling to one or more network links that are connected to one or more of the network(s) 606. For example, the network interface(s) 614 may include an integrated services digital network (ISDN) card, a cable modem, a satellite modem, or a modem to provide a data communication connection to a corresponding type of telephone line. As another non-limiting example, the network interface(s) 614 may include a local area network (LAN) card to provide a data communication connection to a compatible LAN (or a wide area network (WAN) component to communicate with a WAN). Wireless links may also be implemented. In any such implementation, the network interface(s) 614 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 504 and the signals on network links and through the network interface(s) 614, which carry the digital data to and from the computing device 602, are example forms of transmission media. In example embodiments, the computing device 602 can send messages and receive data, including program code, through the network(s) 606, network links, and network interface(s) 614. For instance, in the Internet example, a server might transmit a requested code for an application program through the Internet, the ISP, a local network, and a network interface 614. The received code may be executed by a processor 608 as it is received, and/or stored in the data storage 618, or other non-volatile storage for later execution.

It should be appreciated that the engines depicted in FIG. 6 as part of the computing device 602 are merely illustrative and not exhaustive. In particular, functionality can be modularized in any suitable manner such that processing described as being supported by any particular engine can alternatively be distributed across multiple engines, program modules, components, or the like, or performed by a different engine, program module, component, or the like. Further, one or more depicted engines may or may not be present in certain embodiments, while in other embodiments, additional engines not depicted can be present and can support at least a portion of the described functionality and/or additional functionality. In addition, various engine(s), program module(s), script(s), plug-in(s), Application Programming Interface(s) (API(s)), or any other suitable computer-executable code hosted locally on the computing device 602 and/or hosted on other computing device(s) (e.g., 602) accessible via one or more of the network(s) 602, can be provided to support functionality provided by the engines depicted in FIG. 6 and/or additional or alternate functionality. In addition, engines that support functionality described herein can be implemented, at least partially, in hardware and/or firmware and can be executable across any number of computing devices 602 in accordance with any suitable computing model such as, for example, a client-server model, a peer-to-peer model, and so forth.

It should further be appreciated that the computing device 602 can include alternate and/or additional hardware, software, and/or firmware components beyond those described or depicted without departing from the scope of the invention. More particularly, it should be appreciated that software, firmware, and/or hardware components depicted as forming part of the computing device 602 are merely illustrative and that some components may or may not be present or additional components may be provided in various embodiments. It should further be appreciated that each of the engines depicted and described represent, in various embodiments, a logical partitioning of supported functionality. This logical partitioning is depicted for ease of explanation of the functionality and may or may not be representative of the structure of software, hardware, and/or firmware for implementing the functionality.

In general, the terms engine, program module, or the like, as used herein, refer to logic embodied in hardware, firmware, and/or circuitry, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. "Open source" software refers to source code that can be distributed as source code and/or in compiled form, with a well-publicized and indexed means of obtaining the source, and optionally with a license that allows modifications and derived works. Software instructions may be embedded in firmware and stored, for example, on flash memory such as erasable programmable read-only memory (EPROM). It will be further appreciated that hardware modules/engines may include connected logic units, such as gates and flip-flops, and/or may be further include programmable units, such as programmable gate arrays or processors.

Example embodiments are described herein as including engines or program modules. Such engines/program modules may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a field programmable gate array (FPGA) or an application specific integrated circuit (ASIC). A hardware engine may also include programmable logic or circuitry that is temporarily configured by software to perform certain operations. For example, a hardware engine may include a general-purpose processor or other programmable processor configured by software, in which case, the configured processor becomes a specific machine uniquely tailored to perform the configured functions and no longer constitute general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations of example methods described herein may be distributed among multiple processors, not only residing within a single machine, but deployed across a number of machines. In some example embodiments, the processors may be located in a single geographic location (e.g., within a home environment, an office environment, or a server farm). In other example embodiments, the processors may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may include non-volatile media and/or volatile media. A non-exhaustive list of more specific examples of a computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from transmission media, and thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Non-transitory media, however, can operate in conjunction with transmission media. In particular, transmission media may participate in transferring information between non-transitory media. For example, transmission media can include coaxial cables, copper wire, and/or fiber optics, including the wires that include at least some of the bus(es) 602. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another or may be combined in various ways. All possible combinations and sub-combinations are intended to fall within the scope of the invention. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved.

It should be emphasized that many variations and modifications may be made to the above-described embodiments, the elements of which are to be understood as being among other example embodiments of the invention. All such modifications and variations are intended to be included herein within the scope of the invention. While example embodiments of the invention may be referred to herein, individually or collectively, by the term "invention," this is merely for convenience and does not limit the scope of the invention to any single disclosure or concept if more than one is, in fact, disclosed. The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

The embodiments illustrated herein are described in sufficient detail to enable those skilled in the art to practice the teachings disclosed. Other embodiments may be used and derived therefrom, such that structural and logical substitutions and changes may be made without departing from the scope of the invention. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

As used herein, the term "or" may be construed in either an inclusive or exclusive sense. Moreover, plural instances may be provided for resources, operations, or structures described herein as a single instance. Additionally, boundaries between various resources, operations, program modules, engines, and/or datastores are somewhat arbitrary, and particular operations are illustrated in a context of specific illustrative configurations. Other allocations of functionality are envisioned and may fall within a scope of various embodiments of the invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the invention as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. A computer-implemented method for determining an awareness level of a vehicle occupant, the method comprising:
presenting a first stimulus to the vehicle occupant;
capturing sensor data indicative of at least one of a physiological response or a behavioral response of the vehicle occupant to the first stimulus;
analyzing the captured sensor data;
determining, based at least on the analyzed captured sensor data, the awareness level of the vehicle occupant;
determining a minimum threshold level of awareness based at least in part on a historical awareness level that results in an incident rate below a threshold rate;
determining whether the awareness level of the vehicle occupant satisfies the minimum threshold level of awareness;
in response to determining that the awareness level of the vehicle occupant fails to satisfy the minimum threshold level of awareness, presenting a second stimulus to the vehicle occupant to raise the awareness level of the vehicle occupant, wherein the second stimulus is of a different type or a different intensity from the first stimulus.

2. The computer-implemented method of claim 1, further comprising:
analyzing the sensor data to determine a quantitative value representative of a cumulative response level of the vehicle occupant to the stimulus; and
correlating the quantitative value to the awareness level of the vehicle occupant.

3. The computer-implemented method of claim 1, wherein the physiological response of the vehicle occupant comprises a contraction of a pupil of the vehicle occupant in response to the stimulus, and wherein an amount of the contraction of the pupil is correlated to the awareness level of the vehicle occupant.

4. The computer-implemented method of claim 1, wherein the behavioral response of the vehicle occupant comprises at least one of a head movement of the vehicle occupant or a closing of an eyelid of the vehicle occupant.

5. The computer-implemented method of claim 1, wherein the first stimulus is light having a first intensity level and the second stimulus is light having a second intensity level, and wherein the second intensity level is greater than the first intensity level.

6. The computer-implemented method of claim 1, further comprising:
monitoring the vehicle occupant to identify indicia of a potential drop in the awareness level of the vehicle occupant,
wherein presenting the second stimulus to the vehicle occupant comprises presenting the second stimulus responsive, at least in part, to identifying the indicia of a potential drop in the awareness level of the vehicle occupant.

7. The computer-implemented method of claim 6, wherein monitoring the vehicle occupant comprises:
capturing video data of the vehicle occupant over a period of time; and
analyzing the video data to identify the indicia of a potential drop in the awareness level of the vehicle occupant.

8. The computer-implemented method of claim 7, wherein the vehicle occupant is an operator of a vehicle, and wherein the indicia comprise at least one of: i) a first duration of time that a gaze direction of the operator of the vehicle is not aligned with a travel direction of the vehicle exceeds a first threshold period of time or ii) a second duration of time that an eyelid of the operator covers more than a threshold amount of an eye of the operator exceeds a second threshold period of time.

9. The computer-implemented method of claim 1, wherein the second stimulus includes one of vibrating a steering wheel, increasing an amount of air from a vent, or adjusting a temperature of the air from the vent.

10. A system for determining an awareness level of a vehicle occupant, the system comprising:
at least one processor; and
at least one memory storing computer-executable instructions, wherein the at least one processor is configured to access the at least one processor and execute the computer-executable instructions to:
present a first stimulus to the vehicle occupant;
capture sensor data indicative of at least one of a physiological response or a behavioral response of the vehicle occupant to the first stimulus;
analyze the captured sensor data;
determine, based at least on the analyzed captured an analysis of the sensor data, the awareness level of the vehicle occupant;
determine a minimum threshold level of awareness based at least in part on a historical awareness level that results in an incident rate below a threshold rate;
determine whether the awareness level of the vehicle occupant satisfies the minimum threshold level of awareness;
in response to determining that the awareness level of the vehicle occupant fails to satisfy the minimum threshold level of awareness, present a second stimulus to the vehicle occupant to raise the awareness level of the vehicle occupant, wherein the second stimulus is of a different type or a different intensity from the first stimulus.

11. The system of claim 10, wherein the at least one processor is further configured to execute the computer-executable instructions to:
analyze the sensor data to determine a quantitative value representative of a cumulative response level of the vehicle occupant to the stimulus; and
correlate the quantitative value to the awareness level of the vehicle occupant.

12. The system of claim 10, wherein the physiological response of the vehicle occupant comprises a contraction of a pupil of the vehicle occupant in response to the stimulus, and wherein an amount of the contraction of the pupil is correlated to the awareness level of the vehicle occupant.

13. The system of claim 10, wherein the behavioral response of the vehicle occupant comprises at least one of a head movement of the vehicle occupant or a closing of an eyelid of the vehicle occupant.

14. The system of claim 10, wherein the first stimulus is light having a first intensity level and the second stimulus is light having a second intensity level, and wherein the second intensity level is greater than the first intensity level.

15. The system of claim 10, wherein the at least one processor is further configured to execute the computer-executable instructions to:
monitor the vehicle occupant to identify indicia of a potential drop in the awareness level of the vehicle occupant,
wherein the at least one processor is configured to present the second stimulus to the vehicle occupant by executing the computer-executable instructions to present the second stimulus responsive, at least in part, to identifying the indicia of a potential drop in the awareness level of the vehicle occupant.

16. The system of claim 15, wherein the at least one processor is configured to monitor the vehicle occupant by executing the computer-executable instructions to:
capture video data of the vehicle occupant over a period of time; and
analyze the video data to identify the indicia of a potential drop in the awareness level of the vehicle occupant.

17. The system of claim 16, wherein the vehicle occupant is an operator of a vehicle, and wherein the indicia comprise at least one of: i) a first duration of time that a gaze direction of the operator of the vehicle is not aligned with a travel direction of the vehicle exceeds a first threshold period of time or ii) a second duration of time that an eyelid of the operator covers more than a threshold amount of an eye of the operator exceeds a second threshold period of time.

* * * * *